March 20, 1934.  R. E. BECHTOLD  1,951,816
SYNCHRONICAL SIGNAL SYSTEM
Filed July 31, 1928   8 Sheets-Sheet 1
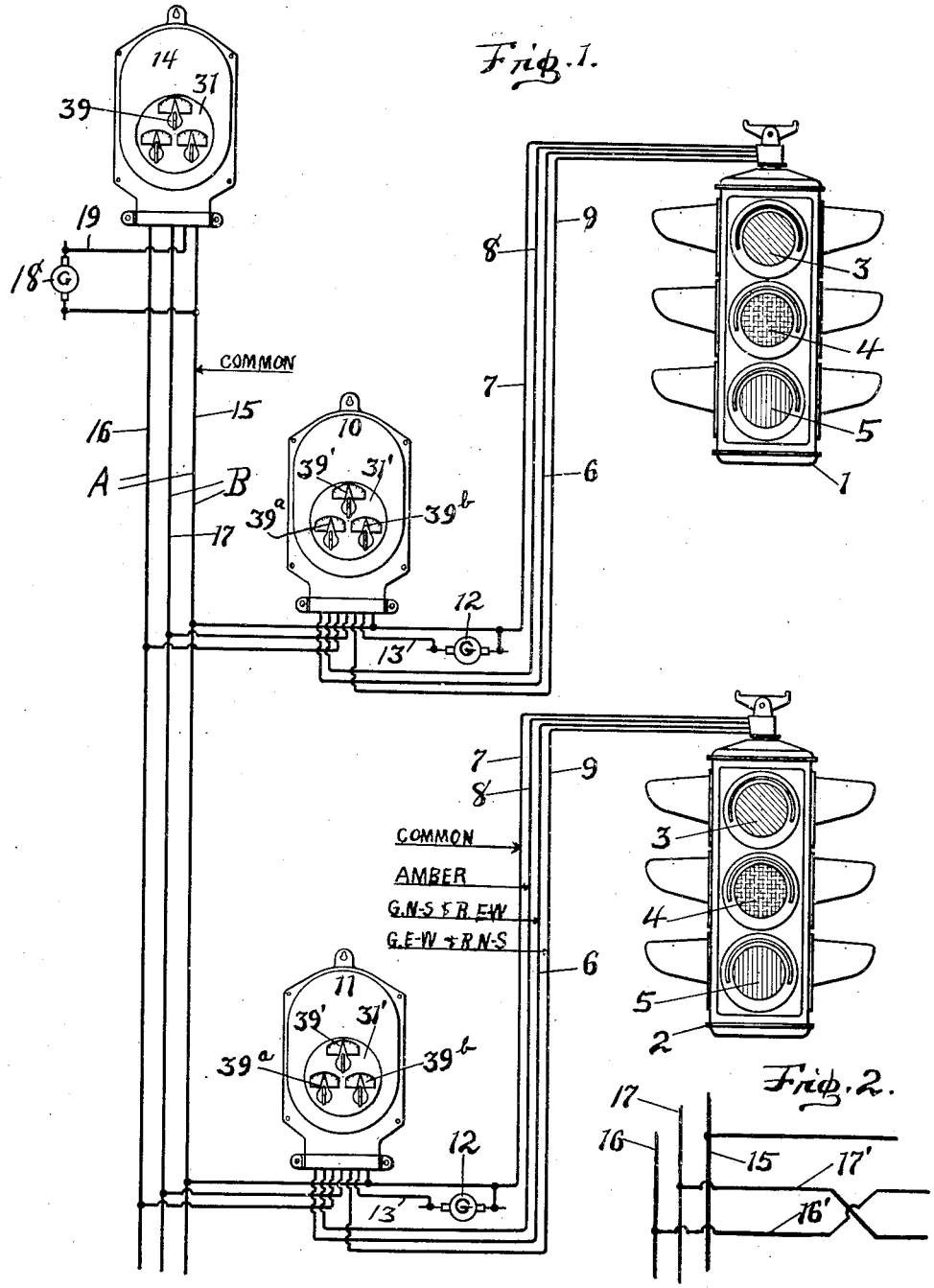

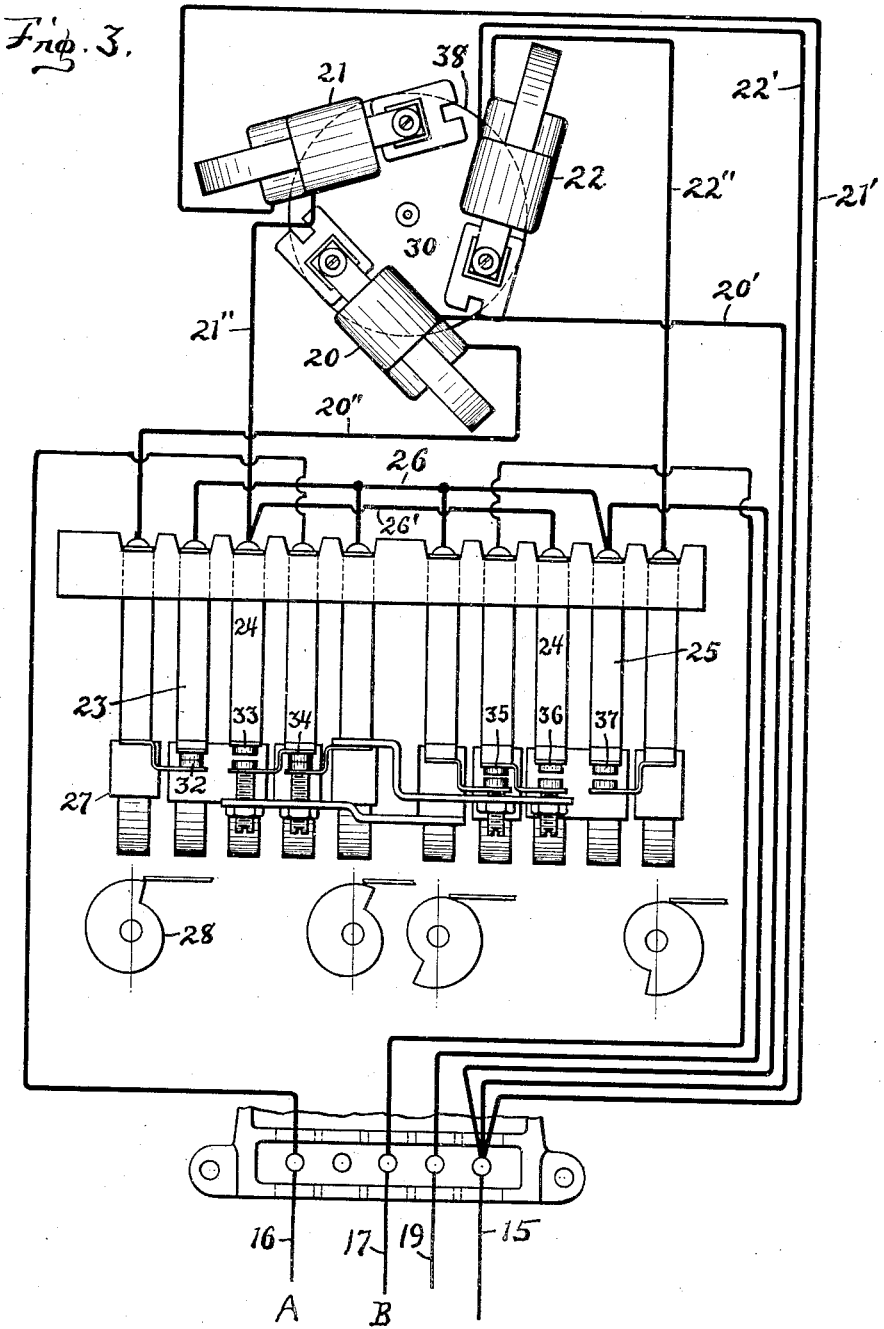

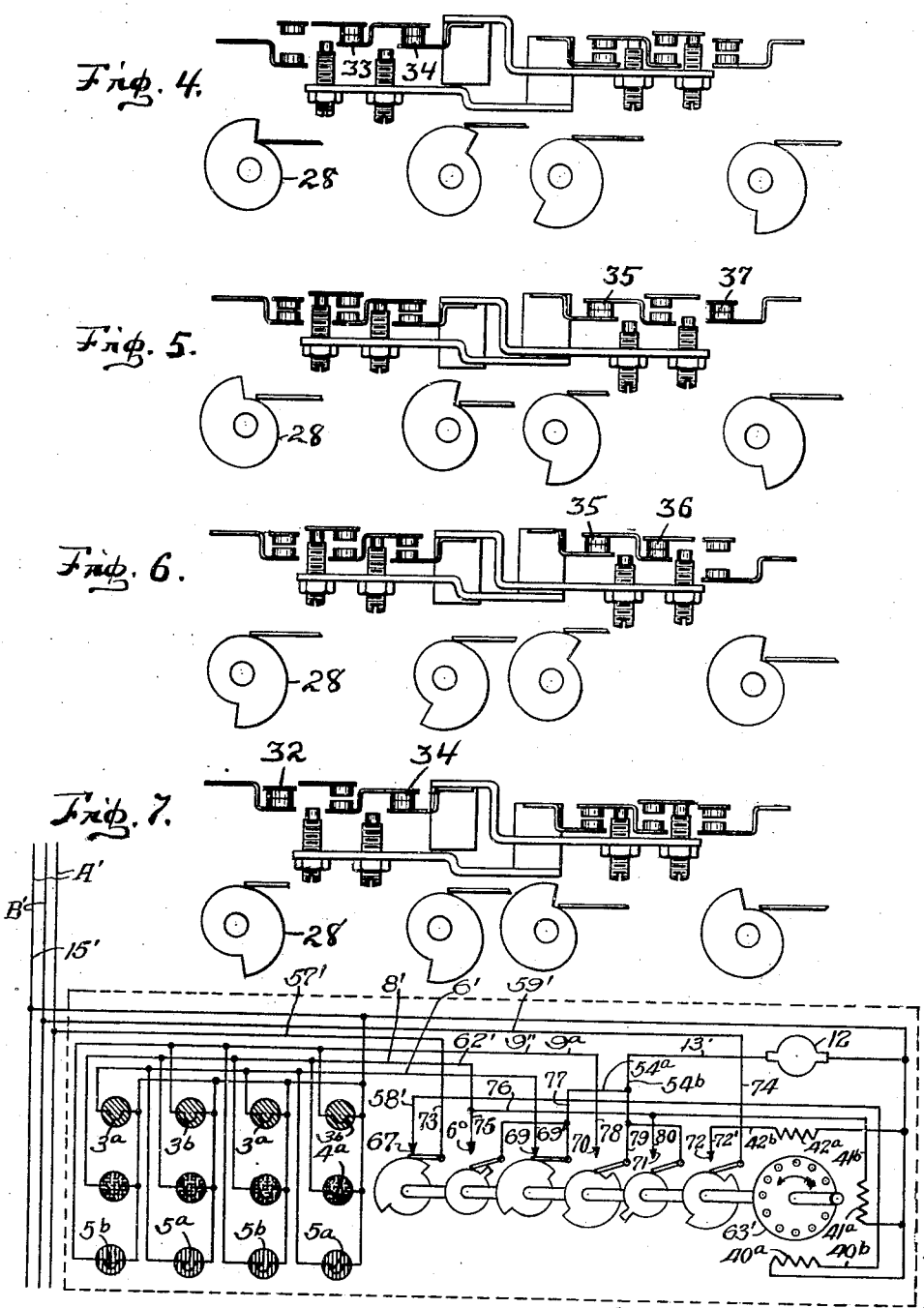

March 20, 1934.    R. E. BECHTOLD    1,951,816
SYNCHRONICAL SIGNAL SYSTEM
Filed July 31, 1928    8 Sheets-Sheet 4

INVENTOR
Reuben E. Bechtold,
BY
W. G. Burns ATTORNEY

March 20, 1934.  R. E. BECHTOLD  1,951,816
SYNCHRONICAL SIGNAL SYSTEM
Filed July 31, 1928  8 Sheets-Sheet 7

INVENTOR
Reuben E. Bechtold
BY
H. G. Burns ATTORNEY

March 20, 1934.  R. E. BECHTOLD  1,951,816
SYNCHRONICAL SIGNAL SYSTEM
Filed July 31, 1928  8 Sheets-Sheet 8
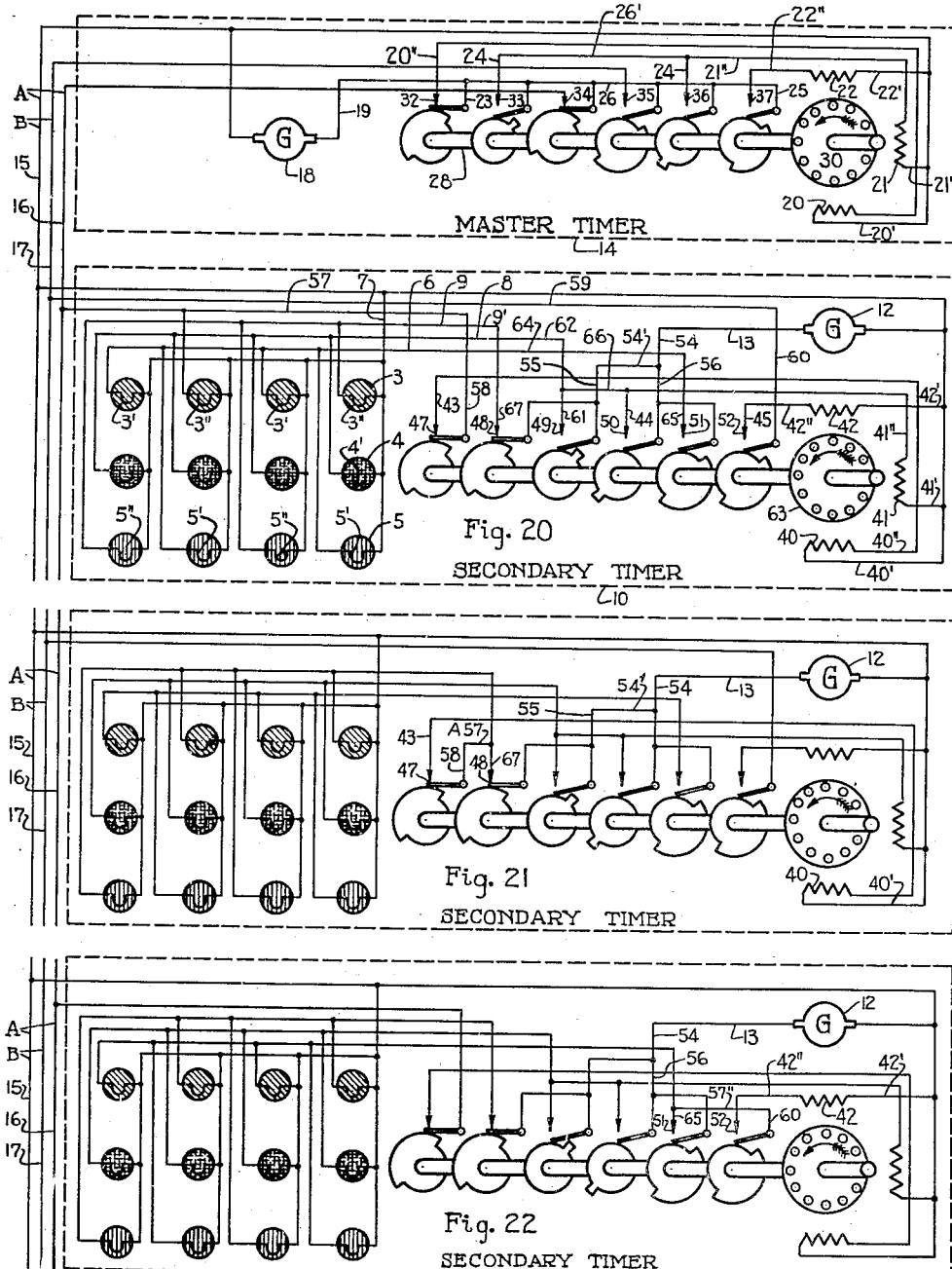

Patented Mar. 20, 1934

1,951,816

UNITED STATES PATENT OFFICE 1,951,816

SYNCHRONICAL SIGNAL SYSTEM

Reuben E. Bechtold, Fort Wayne, Ind., assignor to Tokheim Oil Tank and Pump Company, Fort Wayne, Ind., a corporation of Indiana Application July 31, 1928, Serial No. 296,498

7 Claims. (Cl. 172—293)

This invention relates to improvements in synchronical signal systems of the electrically operated type applicable to street and highway intersections for the control of vehicular traffic, and other purposes, and especially for regulating such signals when the signals are arranged in groups and governed by corresponding controllers, of such type, for example, as that set forth in my previous application for electrical flashers, Serial Number 104,547, now Patent No. 1,926,833, issued September 12, 1933: It has been found advantageous to regulate the operation of a series of traffic signals that are disposed in groups governed by corresponding controllers, for example those signals that are installed along an arterial street, so that the signals will operate in sequence from the first signal to the last with an intervening lapse of time between the operation of each signal and the next succeeding signal, such as will admit of the movement of a vehicle, traveling at a predetermined rate of speed, to pass through-out the length of the street without interruption by any one of the signals along the course. It has also been found advantageous to regulate automatic signals, especially as to the duration of the several indicating periods relative to each other, so as to equalize said periods conformably to and in accordance with the extent of opposing traffic on the respective streets at their crossings.

The objects of the improvement are: First, to provide automatically operated primary and secondary timers in conjunction with a series of traffic signals, or the like, arranged and electrically connected together in such manner as to cause the various signals to perform their respective cycles of operation with uniformity respecting the duration thereof; second, to provide means whereby the change periods of the cycles of said secondary timers may be adjustably varied; third, to afford a system for the control of a series of electrically operated traffic signals, such as are known in the art, whereby the several stages in the cycle of operation of the individual signals may be adjustably varied to accommodate traffic which is in excess of opposing traffic at the street crossings that are controlled respectively by the signals; fourth, to establish means in connection with a series of timer-controlled traffic signals, a master or primary timer whereby the secondary timers respectively controlling said signals are selectively timed with respect to the change periods in their cycles of operation; and fifth, to provide automatic control for a series of traffic signals and also means for adjustment therefor, whereby said signals, when installed on an arterial street, at the street intersections thereof, the indications of said signals may be timed with respect to each other so as to admit of uninterrupted travel of a vehicle along the arterial street, at normal speed, and facilitate movement of the cross street traffic.

The foregoing advantages and objects are contemplated in the invention, and are accomplished by the construction illustrated in the accompanying drawings, in which:—

Fig. 1 is a diagram indicating a typical installation of signal lamps, a master timer, and secondary timers by which the signals are controlled;

Fig. 2 is a fragmentary diagram of a modified arrangement of wire connections for the master and secondary timers;

Fig. 3 is a diagram showing the various working parts and electrical connections of the master timer;

Figs. 4, 5, 6 and 7 are diagrams indicating respectively corresponding stages in the operation of the contact mechanism of the master timer;

Fig. 20 is a wiring diagram of the master timer, a secondary timer, signal lamps, and inter-connections for same;

Fig. 21 is a wiring diagram of an alternative form of connecting a secondary timer;

Fig. 22 is a wiring diagram of a second alternative form of connecting a secondary timer; and Fig. 23 is a wiring diagram of a secondary timer showing an alternative form for controlling the signal lamps.

The characters appearing in the description refer to parts shown in the drawings and designated thereon by corresponding characters.

The invention consists in the arrangement of timing appliances in connection with a series of traffic signals, particularly in the manner in which they are applied. The signals 1 and 2 illustrated in the diagram Fig. 1 are of a well known type, each having groups of green, amber and red indicating members 3, 4 and 5 respectively, the members of each group being disposed in opposite pairs so that one member of each group may be viewed from a corresponding approach to the street crossing where the signal is installed as in the ordinary manner.

Figure 13:
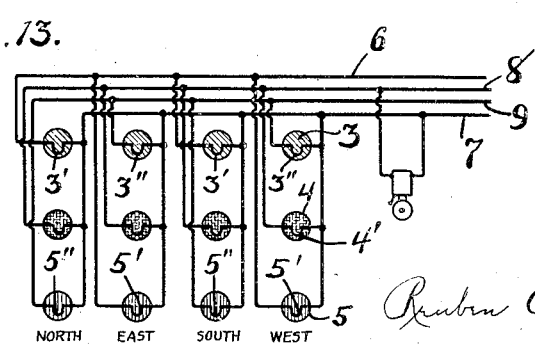
Fig. 13 is a diagram indicating the lamps of an ordinary street traffic signal and the wire connections for same.

The indicating members in each signal are activated respectively by corresponding electric lamps (Fig. 13) connected up in the circuits whereby one pair of lamps 3' for illuminating the corresponding pair of green indicating members, viz., those exposed to the north and south, and a pair of the lamps 5' for the corresponding pair of red indicating members 5, viz., those exposed to the east and west, receive current through conductors 6 and 7; the lamps 4' for the amber indicating members 4 receive current through conductors 8 and 7; and the lamps 3'' for the other pair of green indicating members, viz., those exposed to the east and west, and the pair of lamps 5'' for the other pair of red indicating members 5, viz., those facing north and south, receive current through conductors 9 and 7. Thus, when the circuit through conductors 6 and 7 is energized, the north and south green indicating members 3 and the east and west red indicating members 5 are activated; when the circuit through conductors 8 and 7 is energized, all of the amber indicating members 4 are activated; and when the circuit through conductors 9 and 7 is energized, the north and south red indicating members and the east and west green indicating members 3 are activated.

The signals 1 and 2 are directly controlled by corresponding secondary timers 10 and 11 respectively each signal being connected with its timer by a group of said conductors 6, 7, 8 and 9, there being a local source 12 of energy for supplying current to each signal through corresponding conductors 7 and 13 through the timer connected therewith.

The timers 10 and 11 are each of such construction and operate in the manner as that set forth in my previous application above identified, as is also the master timer 14 which is connected with each of said secondary timers by conductors 15, 16 and 17, which provide two electrical circuits, one A of which is formed by said conductors 15 and 16, and the other B circuit being formed by said conductors 15 and 17. The master timer is supplied with current from a primary source 18 through conductors 15 and 19.

Through the master timer 14 is supplied to said secondary timers electrical energy from the primary source 18 alternately through the circuits A and B formed respectively by said conductors 15 and 16 and 15 and 17.

The master timer

In the master timer the field magnets 20, 21 and 22 are connected with the common conductor 15 by corresponding connections 20', 21' and 22', and the primary source of energy 18 through a conductor 19, corresponding connections 20'', 21'' and 22'' which have communication with said conductor 19 respectively through contact connectors 23, 24 and 25, which connectors are each in circuit with said conductor 19, there being a common connection 26 for said conductor 19 and said connectors 23 and 25, and a similar connection 26' for said connectors 24.

The electrical contact make and break mechanism 27 of the master timer is operated by a cam mechanism 28 which is actuated by the motor 30, and a speed adjuster 31 is provided, as disclosed in said previous application.

The make and break mechanism 27 has six pairs of contactors 32, 33, 34, 35, 36 and 37 respectively, the cam mechanism 27 being so disposed that upon each complete revolution thereof said contactors will be progressed through one complete cycle of their make and break operations. As illustrated in Figs. 4, 5, 6 and 7, there are four stages, or change periods in each complete cycle of operation of the master timer. During the first period (Fig. 4), contactors 33 and 34 are closed, and all of the other contactors are open. Thus, the synchronizing circuit A and the field magnet 21 are energized; during the second period (Fig. 5), contactors 35 and 37 are closed and all other contactors are open, thus synchronizing circuit B and the field magnet 22 are energized; during the third period (Fig. 6), contactors 35 and 36 are closed, and all other contactors are open, thus the synchronizing circuit B and field magnet 21 are energized; and during the fourth period (Fig. 7), contactors 32 and 34 are closed and all other contactors are open, thus synchronizing circuit A and field magnet 20 are energized. In this manner the synchronizing circuits A and B are alternately energized, and the motor actuated continuously, by current supplied from the primary source 18. The speed of the motor may be varied during the periods of time the circuits A and B are energized, which periods are protracted or reduced by adjustably positioning the indexes 39 on the speed adjuster 31 which have the effects of causing the motor armature 38 to revolve with more or less rapidity by the action of the field magnets that are active during the energized periods of the corresponding circuits. Thus, during one complete cycle in the operation of the master timer, each of the circuits A and B are energized during corresponding separate periods of time, one immediately following the other, the duration of each being adjustably regulated independently by the speed adjuster.

The secondary timer

The secondary timers 10—11 are of similar construction to the master timer but differ therefrom in the matter of their electrical connections: In the example illustrated in Fig. 8, the field magnets 40, 41 and 42 are connected with the common conductor 15 by corresponding connections 40', 41' and 42', and by conductors 40'', 41'' and 42'' with contact connectors 43, 44 and 45 respectively which form part of the electrical contact make and break mechanism 46 of the timer. The make and break mechanism 46 has six pairs of contactors 47, 48, 49, 50, 51 and 52, the cam mechanism 53 being so disposed that upon each complete revolution thereof said contactors will be progressed through one complete cycle of their make and break operations.

The contactors 49 and 50 (Fig. 8) are connected with the local source of energy 12 (Fig. 1) by the conductors 13, 54 and 54', and respectively by contact connectors 55 and 56; contactor 47 is connected in circuit with the synchronizing circuit A by conductors 16 and 57 and contact connector 58; contactor 52 is connected in circuit with the synchronizing circuit B by conductors 17 and 59, and contact connector 60; contactor 51 is connected in circuit with the signal conductor 6 for energizing the green north and south, and the red east and west lamps 3' and 5' through connection 64 and connector 65; the signal conductor 7 is connected with the common conductor 15; contactors 49 and 50 are connected in circuit with signal conductor 8 for energizing the amber lamps 4' through connectors 61 and 44 and conductor 62; and contactor 48 is connected in circuit with the signal conductor 9 for energizing the green east and west lamps 3'' and the red north and south lamps 5''.

As illustrated in Figs. 9, 10, 11 and 12, there are four stages, or periods in each complete cycle of operation of the timer. During the first period (Fig. 9) contactor 49 is closed, and all other contactors are open. Thus, the signal amber lamps 4' connected with conductor 8, and the field magnet 41 connected with conductor 41'' are energized by current derived from the local source 12 through the connections 13, 54 and 54' and connector 55. During said first period, the motor armature 63 is propelled by the field magnet 41, and the make and break mechanism 46 is thereby progressed to the second period.

Figure 10:
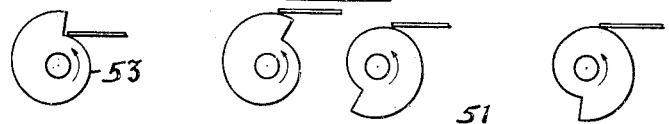

The second period in the cycle of the timer involves a salient feature of the invention: As illustrated in Fig. 10 contactors 51 and 52 are closed, and all other contactors are open. In this instance the signal conductor 6 for the green north and south, and red east and west lamps 3' and 5', is energized through the connection 64 and connector 65 by current supplied from the local source 12 through the connections 13 and 54 and connector 56. The field magnet 42, however, is dependent for its energy upon current derived from the synchronizing circuit B through conductor 17, connection 59 and connector 60, and connection 42''. Progression of the make and break mechanism 46, being dependent upon operation of the armature 63, occurs only when current is supplied from the primary source 18 through the master timer 14 and circuit B, during the energized period of said circuit. Thus, during said second period the signal conductor 6 is energized and the corresponding lamps remain lighted by current from the local source, while the motor armature is progressed by the action of field magnet 42 when energized by current from the primary source 18 through circuit B. In normal operation the speeds of the master and secondary timers are so adjusted that the second position of the contacts in each secondary timer, as shown in Fig. 10, is reached before the synchronizing circuit B is energized. This condition allows the rotor in each secondary timer to stop and all of which start together when circuit B is energized by the master timer. This second period contains a synchronizing period in the cycle of operation of the secondary timer.

During the third period of operation of the timer (Fig. 11), contactor 50 is closed and all other contactors are open. In this instance, the signal conductor 8 for the amber lamps 4' is energized through connections 62, and 66 and connector 44, by current from the local source 12 through connections 13 and 54 and connector 56, and the field magnet 41 is energized by current from the same source through connection 41'' and connector 44.

Figure 12:
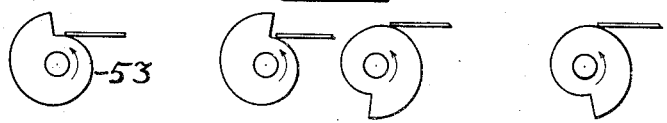

The fourth period in the operation contains another synchronizing period: As illustrated in Fig. 12, contactors 47 and 48 are closed, and all other contactors are open. The signal conductor 9 for the green east and west, and red north and south lamps 3'' and 5'' is energized through connection 9' and connector 67, by current from the local source 12 through connections 13, 54 and 54' and connector 55. Progression of the make and break mechanism 46, being dependent upon operation of the armature 63, occurs during the fourth period by current supplied to the magnet 40 from the primary source 18 through the master timer 14 and circuit A in the same manner as described for the second period of operation. The co-ordination of master and secondary timers is through circuits A and B. The master timer as has been described operates continuously by current from a local source 18 and alternately energizes circuits A and B once in each complete cycle, the length of the complete cycle being regulated by the speed adjuster of the master timer.

Figure 8:
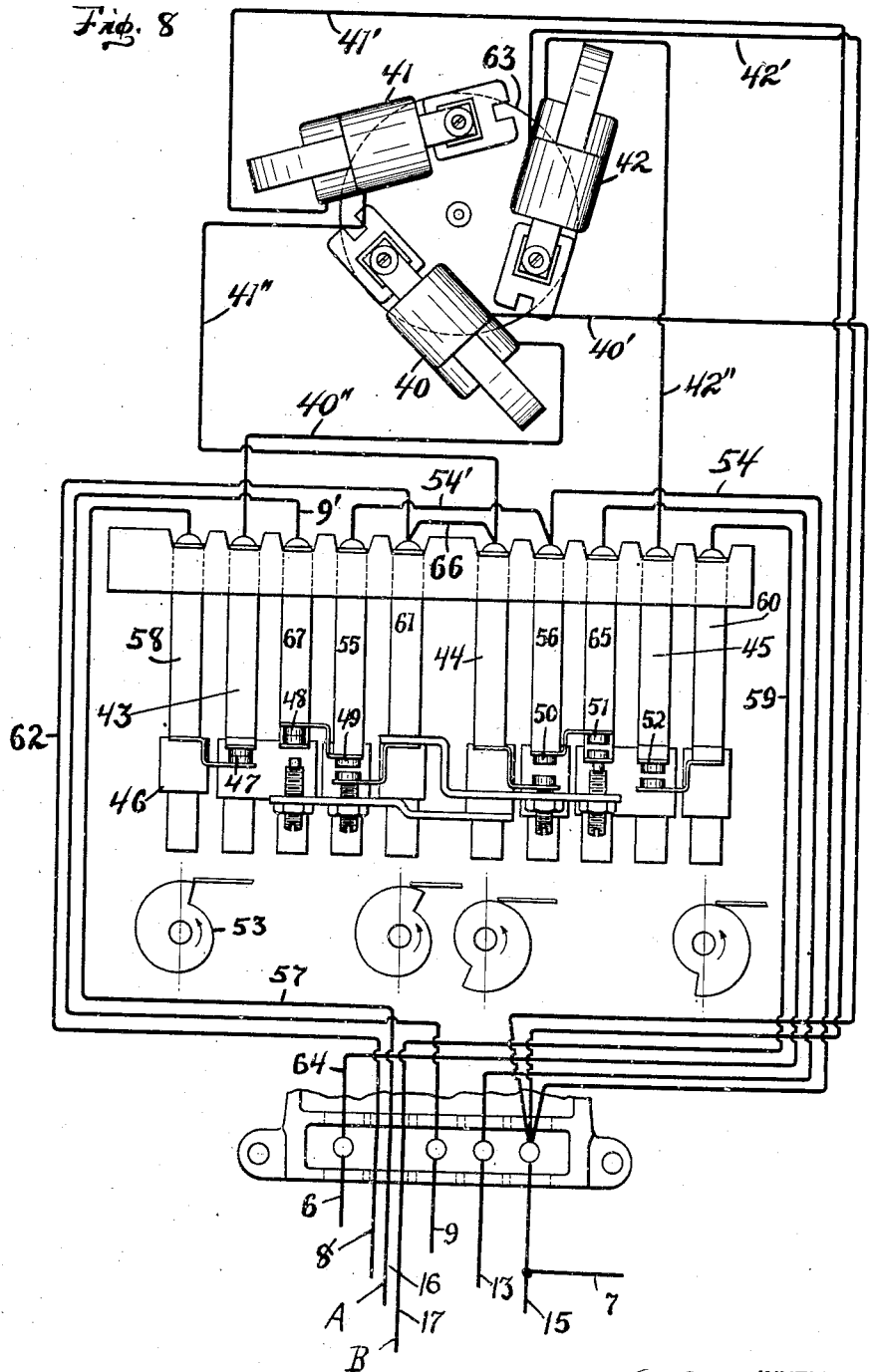
Fig. 8 is a diagram showing the various working parts and electrical connections of a secondary timer as arranged for causing the change periods of the signal to occur in successive order without overlapping each other.
Figure 9:
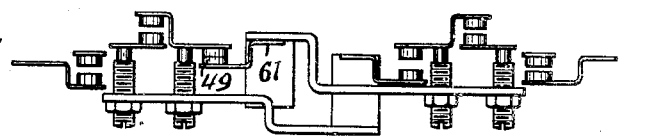
Figs. 9, 10, 11 and 12 are diagrams indicating respectively corresponding stages in the operation of the contact mechanism of the timer shown in Fig. 8.

In the example of a second timer, shown in Fig. 8, progression through the first period or contact position shown in Fig. 9, is by local energy 12 and independent of the master timer through the circuit 13, 54, 54', 55, 49, 41'' to field magnet 41 and through 41' to the common return 15.

The speed adjusters must be so regulated that all secondary timers can complete their functions in less than the total cycle established by the master timer. Under this condition the contact make-and-break mechanism 46 will reach the second position, Fig. 10, before circuit B is energized by the master timer. The lights will be energized by circuit 6 but none of the field magnets will be receiving energy and the driving motor will stop. It is important that all driving motors stop in this way as the co-ordination of the system depends upon driving motors in all secondary timers being started and progressed periodically by energy from the master timer.

Figure 11:
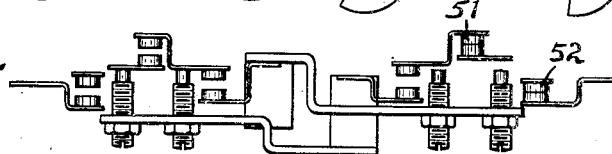

Progression out of the second period, represented by contact position, Fig. 10, after the motor has stopped is by energy from the master timer through circuit 19, 35, 17, 59, 60, 52, 45, 42'' to field magnet 42 and through 42' to the common return 15. Progression through the third period represented by contact position, Fig. 11, is by local energy 12 through the circuit 13, 54, 56, 50, 44, 41'' to field magnet 41 and through 41' to the common return 15.

At the end of the third period the contact make-and-break mechanism 46 will go to the fourth position, as shown in Fig. 11, and again the motor will stop as the speed adjusters on the secondary timer must be so adjusted that progression out of the second period and through the third period is completed before circuit A is energized by the master timer.

When circuit A is energized by the master timer progression out of the fourth period represented by contact position, Fig. 12, after the motor has stopped is by energy from the master timer through circuit 19, 34, 16, 57, 58, 47, 43, 40'' to field magnet 40 and through 40' to the common return 15. Upon completion of the fourth period the cycle is repeated.

By connecting the synchronizing conductors 16 and 17 with the timer, reversely, as by connections 17' and 16' (Fig. 2) current from the primary source through synchronizing circuit A will be utilized in the timer during its second period, and by current from the primary source through synchronizing circuit B during the fourth period thereof. In this manner each individual timer may be caused to complete its cycle of operation in step with the energized period of either synchronizing circuit A or B, according to the arrangement of its connections therewith.

The timers 10—11 are each provided with a speed regulator 31', similar to that provided for the master timer 14, whereby the duration of the respective periods of operation of said timers are adjustably modified. By these provisions the duration of the first and third periods of operation of each timer, when the amber lamps are lighted, may be protracted or reduced by adjusting the index 39' by which the action of field magnet 41 is regulated; and the duration of the second and fourth periods of operation may be protracted or reduced relative to each other by adjusting the indexes 39a and 39b by which the actions of field magnets 40 and 42 are respectively regulated. If for example, index 39b is moved in the direction to increase the speed of the rotor while being operated by field magnet 42, the time required between when circuit B becomes energized and when the make-and-break mechanism is advanced to the third position, as shown in Fig. 11, will be decreased. This will advance the ending of the second period during which the green north and south lamps are lighted. As the third period immediately follows the second it will also be advanced in the cycle with respect to the time when circuit B becomes energized by the master timer and as the beginning of the fourth period immediately follows the third this will also be advanced. The ending of the fourth period is determined by the time at which circuit A becomes energized and by the setting of index 39a which in turn controls the speed at which field magnet 40 operates the rotor.

In a similar way, adjusting index 39a to increase the speed of the rotor advances the ending of the fourth period the position of the first period and the beginning of the second period all with respect to the timer circuit A becomes energized by the master timer.

Adjusting index 39b so as to decrease the speed of the rotor will retard the ending of the second period, the position of the third period and the beginning of the fourth period, and adjusting index 39a so as to decrease the speed of the rotor will retard the ending of the fourth period, the position of the first period and the beginning of the second period all in the cycle as established by the master timer. The ranges of all adjustments of secondary timers must be such that they can complete their respective functions within the total cycle established by the master timer and allow time for each secondary timer rotor to come to rest at least once in each total cycle so that all timers may be started and thus kept in step by the master timer. The total passage of time during the performance of each complete cycle of the timer is controlled by the master timer through the synchronizing circuits A and B, as the timer is dependent upon current derived through said circuits for its operation during its fourth and second periods, and hence the cycles of the timers are maintained in relativity with those of the master timer. When it is found desirable to either prolong or reduce the time duration of any of the signal periods, considerably, to suit unequal traffic at various street crossings, the respective energized periods of circuits A and B may be lengthened or shortened by adjustment of the indexes 39 on the master timer 14, in which event the timers may be conveniently connected up with the synchronizing circuits A and B so as to receive current therefrom and be activated thereby during corresponding synchronizing periods. In this manner current for a sufficient length of time is supplied to the timers for their operation throughout their synchronized periods.

Figure 19:
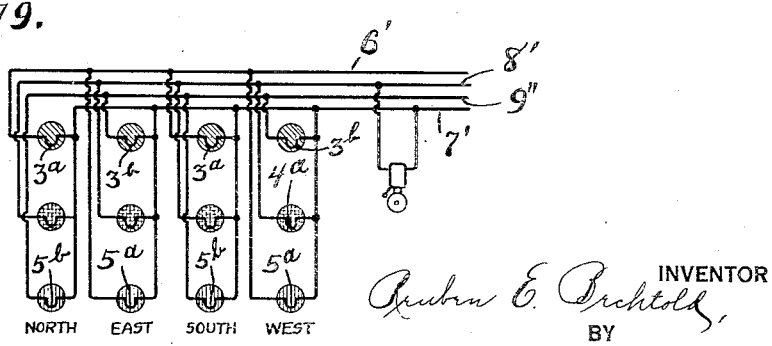
Fig. 19 is a diagram indicating the lamps of an ordinary street traffic signal and the wire connections for same, which diagram is similar to that shown in Fig. 13.

In some instances, it is desirable that the periods of lighting of the north and south green lamps 3a (Fig. 19) and the east and west red lamps 5a be continued through the lighting of the amber lamps 4a during the third period, and that the lighting of the east and west green lamps 3b and the north and south red lamps 5b be continued through the lighting of the amber lamps 4a during the first period. In such instance the timer is arranged and electrically connected, as illustrated in Fig. 14, in which the contact make and break mechanism 46' is provided with contactors 67, 68, 69, 70, 71 and 72.

The contactors 67 are in circuit with the synchronizing circuit A' through a connection 57' and connector 73, and also with field magnet 40a through connector 58' and connection 40b; contactors 72 are in circuit with the synchronizing circuit B' through connection 59' and connector 74, and also with field magnet 42a through connector 72' and connection 42b; contactors 68 are in circuit with the signal conductor 8' for the amber lamps 4a through connection 62' and connector 75, and also with field magnet 41a through connector 75 and connections 76 and 41b; contactors 69 are in circuit with the signal conductor 6' for the green north and south and red east and west lamps 3a and 5a through connection 6a and connector 69', and also with the local source of energy 12 through connector 77 and connections 54a and 54b; contactors 70 are in circuit with the signal conductor 9" for the east and west green lamps 3b and the north and south red lamps 5b, through connection 9a and connector 78, and also with the local source of energy 12 through connections 13' and 54b and connector 79; and contactors 71 are in circuit with signal conductor 8' for the amber lights 4a through connections 62' and 76 and connector 80, and also with field magnet 41a through connection 41b and connector 80.

Figure 14:
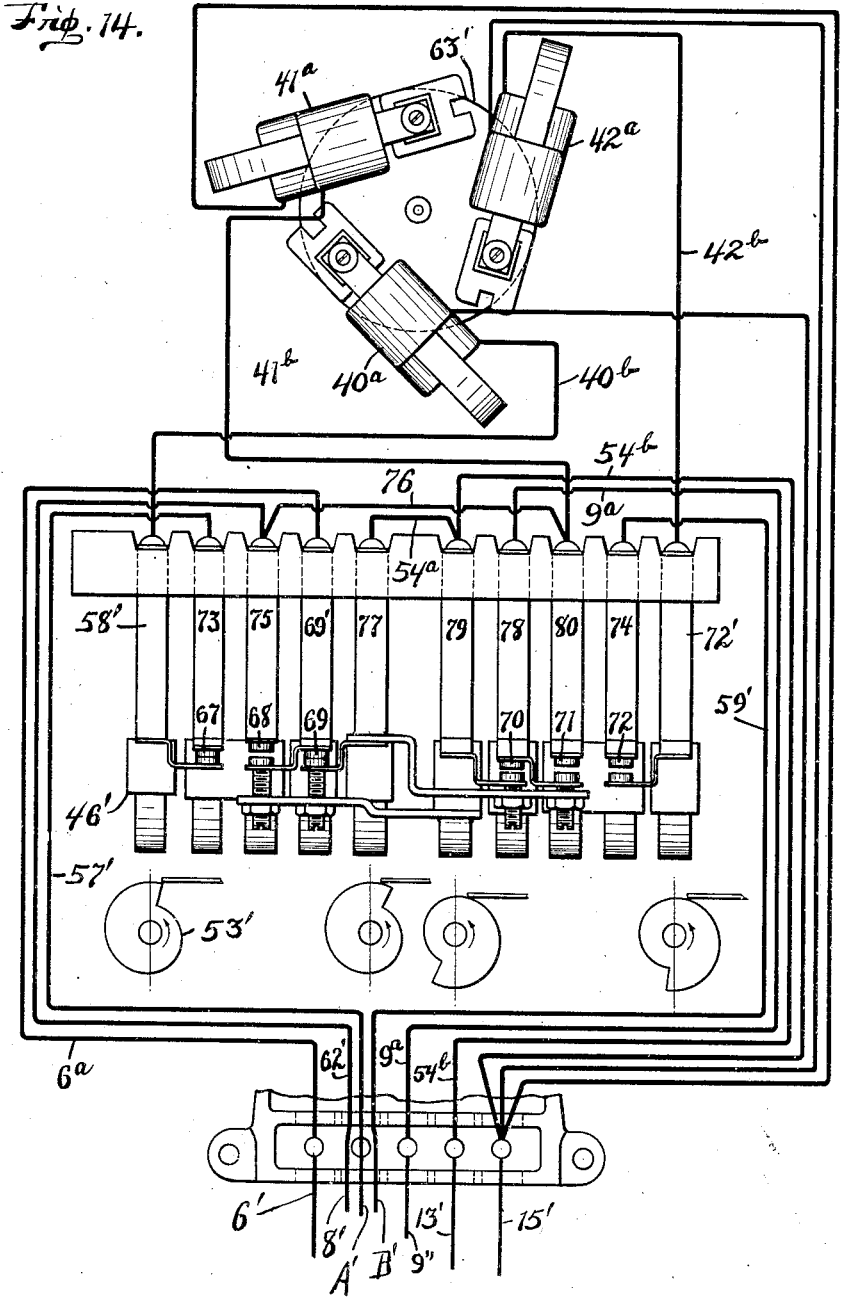
Fig. 14 is a diagram showing the various working parts and electrical connections of a secondary timer as arranged for causing the change periods of the signal to occur in successive order with an overlap between certain of the change periods.
Figure 15:
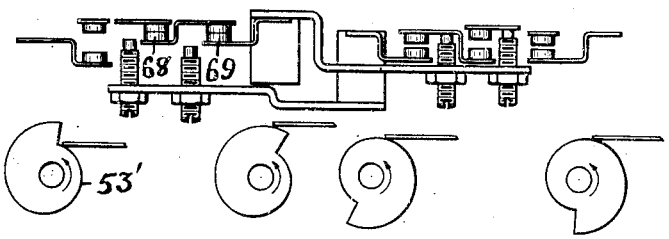
Figs. 15, 16, 17 and 18 are diagrams indicating respectively corresponding stages in the operation of the contact mechanism of the timer shown in Fig. 14.

As illustrated in Figs. 15, 16, 17 and 18, there are four stages, or periods, in each complete cycle of operation of the timer when arranged as indicated in Fig. 14:

During the first period (Fig. 15), contactors 68 and 69 are closed, and all other contactors are open. Thus, the signal amber lamps 4a connected with conductor 8', and the field magnet 41a through connections 76 and 41b, are energized by current from the local source 12 through connector 77 and connections 54a, 54b and 13'. Also, from the same source signal conductor 6' for the green north and south and red east and west lamps 3a and 5a, is energized through connection 6a and connector 69'. During said first period, the motor armature 63' is propelled by the field magnet 41a, and the make and break mechanism 46' is thereby progressed to the second period.

Figure 16:
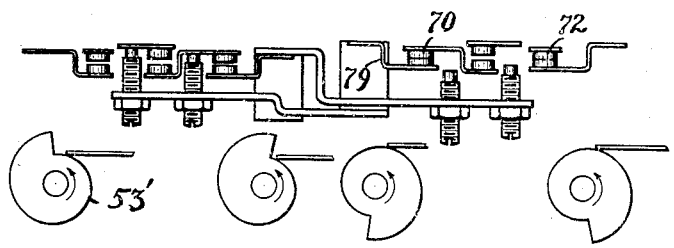

As illustrated in Fig. 16, contactors 70 and 72 are closed, and all other contactors are open. In this instance, signal conductor 9" for the green east and west and the red north and south lamps 3b and 5b, is energized through connection 9a and connector 78 by current supplied from the local source 12 through connections 13' and 54b, and connector 79. The field magnet 42a, however, is dependent for its energy upon current derived from the synchronizing circuit B' through connection 59', connectors 74 and 72' and connection 42b. Progression of the make and break mechanism 46' being dependent upon operation of the armature 63', occurs only when current is supplied from the primary source 18 through the master timer 14 and circuit B', during the energized period of said circuit. Thus, during the said second period the signal conductor 9" is energized and the corresponding lamps remain lighted by current from the local source, and the motor armature is progressed by the action of the field magnet 42a only when energized by current from the primary source.

The second period in the operation of the secondary timer, in this instance, contains a synchronizing period.

Figure 17:
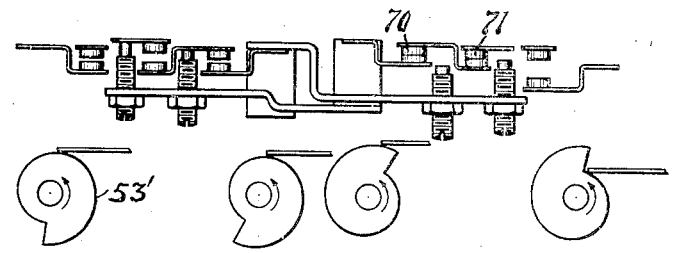
Figure 18:
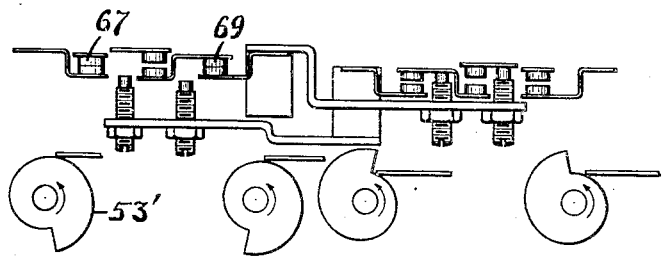

As illustrated in Fig. 17, during the third period in the operation of the timer, (Fig. 14), contactors 70 and 71 are closed, and all other contactors are open. Thus, the signal conductor 8' for the amber lamps 4a, is energized through connector 80, and connections 76 and 62', and the field magnet 41a is energized through the connector 80 and connection 41b, and also signal conductor 9" for the green east and west, and red north and south lamps 3b and 5b, is energized through connection 9a and connector 78, by current from the local source 12 through connections 13' and 54b, and connector 79.

During the fourth stage (Fig. 18), contactors 67 and 69 are closed, and all other contactors are open. Thus, the field magnet 40a is energized by current from the primary source through the connections A', connectors 73 and 58' and connection 40b; signal conductor 6' for the green, north and south, and red east and west lamps 3a and 5a, is energized by current from the local source of energy 12 through connections 13' 54b and 54a, and connector 77.

In the operation of the secondary timer, when arranged as in Fig. 14, that period in which the green north and south and the red east and west lamps 3a and 5a, and that period when the green east and west and the red north and south lamps 3b and 5b, are lighted, overlap those periods in which the amber lamps 4a are lighted.

During the fourth period (Fig. 18), the contactors 69 are closed and the green north and south and red east and west lamps are lighted, and in the first period (Fig. 15) the contactors 69 remain closed, and the green north and south and red east and west lamps continue lighted throughout said periods. However, during said first period contactors 68 are closed and consequently the amber lamps 4a are lighted also, the lighting of which amber lamps serve as a pre-warning of the impending conclusion of indicating periods of the other lighted lamps. Likewise during the second and third periods (Figs. 16 and 17) contactors 70 remain closed, and the green east and west and red north and south lamps 3b and 5b continue lighted throughout said periods. However, during said third period contactors 71 are closed and consequently the amber lamps 4a are lighted also as in the previous instance.

The timers shown in Figs. 8 and 14 are similar in that the signal lamps connected therewith are lighted only by energy from the local source, and the motor is activated during the second and fourth periods by energy derived from the primary source through the synchronizing circuits respectively, and during the first and third periods by current from the local source.

In the operation of the invention, current from the primary source 18 is supplied to the master timer, and from the local sources 12 to the corresponding timers. The synchronizing circuits A and B thereby become periodically energized, the energized period of circuit A alternating with the energized period of circuit B.

Any timer (Figs. 8 and 14) in its first period of operation is progressed through said period by local current to the second stage or period and the corresponding signal lamps are lighted by the local current. However, progression of the make and break mechanism during said second stage awaits the energizing period of the synchronizing circuit B—B'. When said synchronizing circuit becomes energized the timer is thereby progressed through its second stage to the third stage, whereupon it is again progressed by the local current through said third stage to the fourth stage. Progression of the timer when in its fourth stage awaits the energizing period of the synchronizing circuit A—A', and when said synchronizing circuit becomes energized the timer is thereby progressed through its fourth stage. In this manner all of the timers are maintained in a state of relativity with the synchronizing periods of the circuits B—B' and A—A'.

By reversing the synchronizing circuits in their connections with the timers (Fig. 2) their second and fourth stages will become timed with the corresponding opposite synchronizing circuits. Thus, one timer may be connected so as to be progressed during its second period by a current from the synchronizing circuit A and during its fourth period by current from the synchronizing circuit B, while another timer may be connected so as to be progressed during its second stage by current from the synchronizing circuit B, and during its fourth stage by current from the synchronizing circuit A. In this manner the operation of the first timer during its second period will correspond with the operation with the other timer during the fourth period thereof and vice versa, and the signals controlled by said timers will be activated accordingly, one in advance of the other. Facility is thus afforded when installing the signals whereby the timing of the various indications of one signal with respect to those of another signal may be varied, which is advantageous, especially when it is desired to permit traffic to move continuously on any street.

The relative duration of the periods of the timer may be altered somewhat, aside from that effected by adjusting the indexes of their speed adjusters 31'. For instance, the connection 57 (Fig. 20) may be removed and connector 58 may be connected to connector 67 by connection A57 (Fig. 21) in which case the motor will be activated by field magnet 40 through the fourth period from the local source 12 through circuit 13, 54, 54', 55, 48, A57, 58, 47, 43, 40 and 40'. In this event only during the second period, progression of the motor is dependent upon current from the primary source through synchronizing circuit B. Or, the connection 59 may be removed and connector 60 may be connected to connector 65 by connection 57" (Fig. 22) in which case the motor will be activated by field magnet 42 through the second period from the local source 12, through circuit 13, 54, 56, 51, 65, 60, 52, 42″, 42 and 42′. In this event, during the fourth period only, progression of the motor is dependent upon current from the primary source through the synchronizing circuit A. In such instances the motor is progressed through three successive stages of its cycle by energy from the local source. The lamps of the signal controlled by the timer are energized by current from the local source throughout all periods in the cycle.

When but a single synchronizing circuit is employed, progression of the motor through three of the periods of the cycle is continuous, while during the remaining period the motor is dependent upon current from the synchronizing circuit with which the timer is connected, and the motor becomes progressed during such period only during the energized period of the synchronizing circuit. The timer enters the period in which synchronizing takes place when its synchronizing circuit is without energy, and further progression thereof is thus interrupted, and is resumed only when the synchronizing circuit is again energized. Thus, when the time of periodic energizing of the synchronizing circuits is changed by adjustment of the speed of the master timer, the synchronized period of the secondary timer becomes more or less protracted. In this manner the relative duration of a synchronized period of one timer with that of another timer may be varied inasmuch as one timer may be connected so as to operate during one period with current from one synchronizing circuit, while another secondary timer is connected to operate during its second and fourth periods with current from the same synchronizing circuits and vice versa.

Other rearrangements of the various connections in the secondary timers, and between the master timer and the secondary timers, may be made to suit requirements in the relative timing of the various signals, as they are found by the engineer to exist, without departure from the invention. Additional secondary timers may be established under control of the master timer by connecting the additional timers in the circuits A—B at any suitable points on the wires 15, 16 and 17.

What I claim is:

1. In apparatus of the class described, a master timer having make-and-break mechanism and an electric motor for activating it, a secondary timer having an individual make-and-break mechanism and a motor for activating it, an electrical synchronizing circuit controlled by the make-and-break mechanism of said master timer so that said circuit is periodically energized at regulated intervals, said circuit having connection with the make-and-break mechanism of said secondary timer so the motor of said secondary timer is activated during a synchronizing period in the cycle of the secondary timer and only when said circuit is energized, a second electrical circuit controlled by the make-and-break mechanism of said secondary timer so current is supplied to the motor therefor independent of the synchronizing circuit during the other periods in the cycle of said secondary timer, and current supply means for said circuits.

2. In apparatus of the class described, a master timer having make-and-break mechanism and an electric motor for activating it, a secondary timer having an individual make-and-break mechanism and a motor for activating it, an electrical synchronizing circuit controlled by the make-and-break mechanism of said master timer so that said circuit is periodically energized at regulated intervals, said circuit having connection with the make-and-break mechanism of said secondary timer so the motor of said secondary timer is activated during a synchronizing period in the cycle of the secondary timer and only when said circuit is energized, a second electrical circuit controlled by the make-and-break mechanism of said secondary timer so current is supplied to the motor therefor independent of the synchronizing circuit during the other periods in the cycle of said secondary timer, adjusting means for the master timer to vary the speed of the motor therefor selectively with respect to the periods in its cycle, another adjusting means for the secondary timer to vary the speed of the motor therefor selectively with respect to the periods in its cycle, and current supply means for said circuits.

3. In apparatus of the class described, a master timer having make-and-break mechanism and an electric motor for activating it, a series of secondary timers having individual make-and-break mechanisms and motors for activating them, an electrical synchronizing circuit controlled by the make-and-break mechanism of said master timer so that said circuit is periodically energized at regulated intervals, said circuits having connections with the make-and-break mechanisms of said secondary timers so the motors of said secondary timers are activated during synchronizing periods in the cycles of the secondary timers and only when said circuit is energized, other electrical circuits controlled respectively by the make-and-break mechanisms of said secondary timers so current is supplied to the motors therefor independent of the synchronizing circuit during the other periods in the cycles of said secondary timers, and current supply means for said circuits.

4. In apparatus of the class described, a master timer having make-and-break mechanism and an electric motor for activating it, a series of secondary timers having individual make-and-break mechanisms and motors for activating them, an electrical synchronizing circuit controlled by the make-and-break mechanism of said master timer so that said circuit is periodically energized at regulated intervals, said circuits having connections with the make-and-break mechanisms of said secondary timers so the motors of said secondary timers are activated during synchronizing periods in the cycles of the secondary timers and only when said circuit is energized, other electrical circuits controlled respectively by the make-and-break mechanisms of said secondary timers so current is supplied to the motors therefor independent of the synchronizing circuit during the other periods in the cycles of said secondary timers, adjusting means for the respective timers to vary the speed of the motors therefor selectively with respect to the periods in their cycles, and current supply means for said circuits.

5. In an electrical synchronizing system, an electrical synchronizing circuit provided with a source of energy, a master timer having automatically operating means controlling said circuit so that said circuit is periodically energized at regulated intervals, a secondary timer having a make-and-break mechanism and a motor for activating it, a second electrical circuit having a source of energy and controlled by the make-and-break mechanism of said secondary timer, connections between said mechanism and the motor for the secondary timer arranged so that said motor is energized by current from said second circuit only during certain periods in the cycle of the secondary timer, and other connections controlled by said mechanism between said synchronizing circuit and said motor arranged so said motor is activated during a synchronizing period in the cycle of the secondary timer when said synchronizing circuit is energized to thereby complete the cycle of said secondary timer in step with the master timer.

6. In an electrical synchronizing system, an electrical synchronizing circuit provided with a source of energy, a master timer having automatically operating means controlling said circuit so that said circuit is periodically energized at regulated intervals, a series of secondary timers having individual make-and-break mechanisms and motors for activating same, other electrical circuits for the respective secondary timers having a source of energy and controlled by the make-and-break mechanisms of the corresponding secondary timers, connections between said mechanisms and complemental motors therefor arranged so that said motors are energized by current from the corresponding one of said second circuits only during certain periods in the cycles of said secondary timers, other connections between said synchronizing circuit and said motors respectively controlled by the complemental make-and-break mechanisms arranged so said motors are activated during synchronizing periods in the cycles of the respective secondary timers when said synchronizing circuit is energized to thereby complete the cycles of said secondary timers in step with the master timer.

7. In an electrical synchronized system, a master timer, synchronizing circuits controlled by said timer and connected with a source of current so that said circuits are periodically energized at regulated intervals, a series of secondary timers having individual make-and-break mechanisms respectively and complemental motors to drive said mechanisms, connections between one or the other of said synchronizing circuits respectively with the said motors controlled by their complemental make-and-break mechanisms arranged so that each motor is activated by current from the synchronizing circuit connected therewith during only the synchronizing period in the cycle of the corresponding secondary timer, and other circuits provided with a source of current connected with the motors of said secondary timers respectively controlled by their complemental make-and-break mechanisms to activate said motors independent of said synchronizing circuits during the other periods in the cycles of said secondary timers.

REUBEN E. BECHTOLD.